W. B. OWEN.
TIRE.
APPLICATION FILED JUNE 23, 1915.
1,185,530.
Patented May 30, 1916.
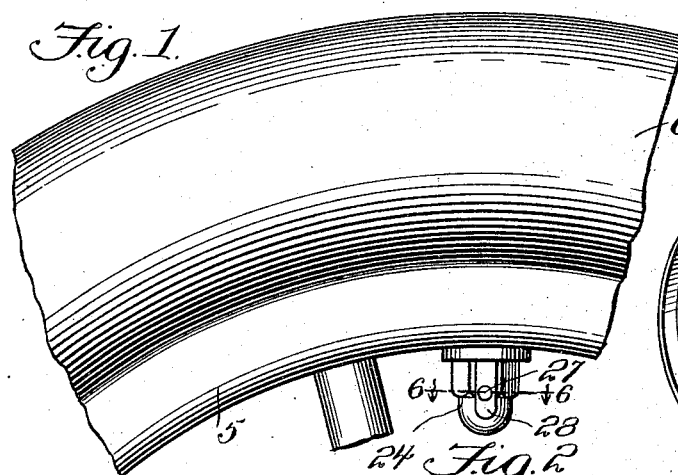
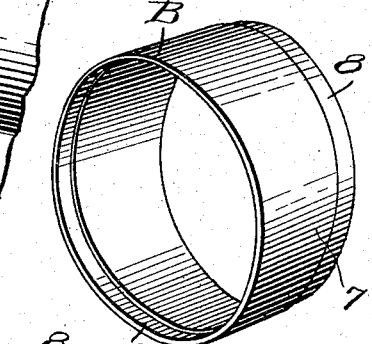
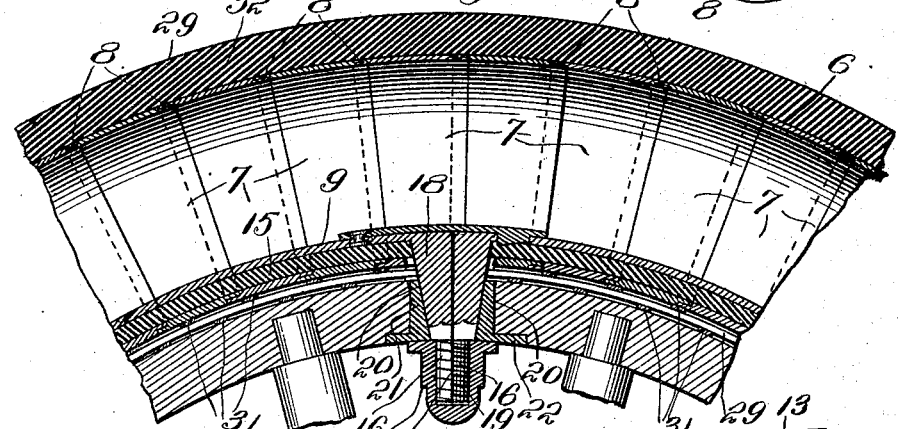
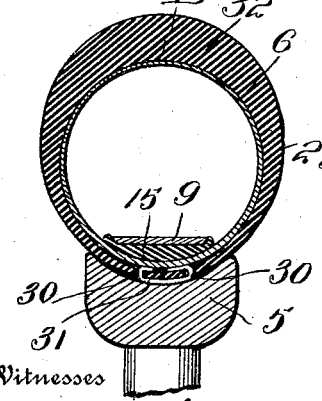
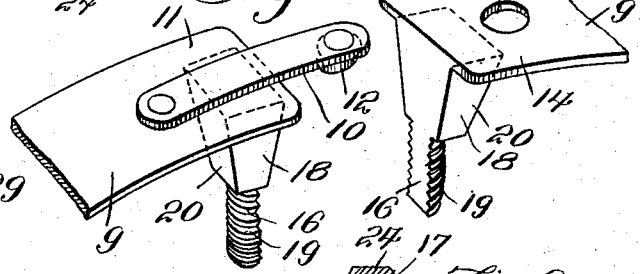
Inventor
W. B. Owen
By Victor J. Evans
Attorney
Witnesses

UNITED STATES PATENT OFFICE.

WILLIAM B. OWEN, OF ROOSEVELT, UTAH.

TIRE.

1,185,530. Specification of Letters Patent. Patented May 30, 1916.

Application filed June 23, 1915. Serial No. 35,847.

*To all whom it may concern:*

Be it known that I, WILLIAM B. OWEN, a citizen of the United States, residing at Roosevelt, in the county of Duchesne and State of Utah, have invented new and useful Improvements in Tires, of which the following is a specification.

The present invention relates to improvements in vehicle wheel tires, and has for its object the provision of a resilient tire to take the place of the ordinary pneumatic tire, which is puncture-proof thereby eliminating considerable trouble and difficulty experienced with the pneumatic tire, and at the same time possessing all the advantages of the latter.

In carrying out my invention I further aim to provide a novel construction of means for fastening the tire upon the rim of the wheel, with a view of preventing circumferential movement of the tire about the rim, as well as to facilitate the operation of applying or removing the tire when desired.

Other objects will appear as the nature of the invention is better understood, the same residing in the construction, combination and arrangement of parts hereinafter more fully described.

In the drawing forming part of this application like numerals of reference indicate similar parts in the several views and wherein:—

Figure 1 is a fragmentary view of a wheel showing my improved tire applied thereto. Fig. 2 is a longitudinal sectional view. Fig. 3 is a transverse sectional view. Fig. 4 is a detail perspective view of one of the circular metallic sections of the tire. Fig. 5 is a view showing the adjacent ends of the clamping band separated. Fig. 6 is a sectional view taken on line 6—6 of Fig. 1.

Referring more particularly to the drawing 5 indicates the rim of the wheel which is of concavo-convex formation in cross section, and within the concaved periphery is seated the tire 6 constructed in accordance with my invention.

The tire essentially consists of a series of circular sections 7 constructed from suitable springy metal, preferably steel, the sections being continuous without any rivets or seams, and have relatively thin end portions 8 adapted to be fitted within the adjacent section to form a continuous tube as shown. Each of the sections gradually increase in thickness from a point B indicated in Fig. 4 toward the center of the rim 5 to strengthen the tube.

A split circumferential metal band 9 is arranged within the tube, and has its adjacent ends connected together by means of a leaf spring 10, having one of its terminals secured to the end portion 11 of said band, while the opposite terminal of the spring carries a lug 12 adapted to be received within a suitable opening 13 in the adjacent end portion 14 of the band. The band is seated upon a strip of rubber 15 the latter forming a cushion for the band 9, although this cushion may be constructed of felt or any other material suitable for the purpose. The meeting ends of the band 9 are provided with a depending half-bolt 16 which when operatively associated by fastening the adjacent ends of the band together through the medium of the leaf spring 10, constitute a fastening bolt 17, which latter projects through a suitable opening in the cushion 15, the metallic tube, and the rim 5 of the wheel as clearly shown in Fig. 2. The bolt is formed to provide an enlarged squared outer portion indicated at 18 and a reduced cylindrical threaded portion 19, the squared portion being tapered as indicated at 20 and upon which is adapted to be fitted a similarly tapered sleeve 21 of rectangular formation in cross section. The sleeve is provided with a horizontally disposed flange 22 adapted to bear against the innerside of the rim 5, lying flush with the surface thereof, while adjustably associated with the cylindrical threaded portion 19 of the bolt is the nut 24, the latter holding the parts operatively associated, whereby the tire in its entirety is effectively held within the concaved periphery of the rim 5. The sleeve 21 effectively braces the bolt 17, thereby relieving the same of undue strain to which it is subject through tendency of the tire to move circumferentially about the rim of the wheel.

The meeting faces of the semi-cylindrical threaded portions of each of the half-bolts 16, define a groove 25 disposed at the opposite sides of the bolt when these parts are operatively associated, the grooves 25 being adapted to receive a spring pressed pin 27, secured to one end of a leaf spring 28 carried by the nut, the pin 27 projecting through a suitable opening in the nut which when engaged in the grooves 25 lock the said nut against retrograde movement of the bolt.

A resilient cover or casing 29, preferably constructed from soft rubber extends circumferentially around and wholly incloses the resilient metal tube, to exclude moisture, dust, dirt or other foreign matter, the adjacent longitudinal edges of the casing being provided with alined openings 30 through which is threaded a lacing element 31 for connecting the adjacent edges of the casing as clearly shown and holding the same operatively positioned with respect to the metallic tube. The casing has a relatively thick tread portion 32 which adds to the elasticity or resiliency of the metallic tube, so that the tire as a whole will readily yield at the point of impact, for absorbing the jar that would otherwise be transmitted to the wheel in traveling over an irregular surface, thereby possessing the same advantage possessed by the ordinary pneumatic tire, and at the same time providing a substitute for the pneumatic tire which is positively puncture-proof, thereby eliminating a number of disadvantages incident to the use of pneumatic tires. It will be obvious by reason of the specific fastening means employed for securing the tire to the rim, the duty of applying or removing the tire from the rim when necessary may be expeditiously and easily performed. It is to be further understood that any one or more of the circular sections 7 of the metallic tube may be removed for repairs or substituted by a new section when desired, the construction and association of the different parts being such to provide for this end.

It is believed that from the foregoing description the nature and advantages of the invention will be thoroughly understood without requiring a more extended explanation and therefore the same has been omitted.

What I claim is:

1. A spring tire for wheels comprising a continuous resilient tube, a resilient cover wholly inclosing the said tube, a split circumferential band arranged within the tube, means detachably connecting the adjacent ends of said band, a bolt having a squared portion and a reduced cylindrical threaded portion associated with the band and passed through the said tube and rim of the wheel, a sleeve fitted upon the squared portion of the bolt, and a nut adjustably mounted upon the threaded projecting portion thereof.

2. A spring tire for wheels comprising a continuous resilient metal tube, a resilient cover wholly inclosing the said tube, a split circumferential band arranged within the tube, a cushion disposed between the band and said tube, means for detachably securing the adjacent ends of the band, a sectional bolt, one section of the bolt being carried by each of the adjacent ends of said band, and adapted to be operatively associated when the adjacent ends of said band are connected, said bolt passing through the tube and rim of the wheel, and a nut adjustably mounted upon the threaded projecting portion of said bolt.

3. A spring tire for wheels comprising a continuous resilient metal tube, a resilient cover wholly inclosing the tube, a split circumferential band arranged within the tube, means detachably connecting the adjacent ends of said band, a sectional bolt, one section of the bolt being carried by each of the adjacent ends of said band, and adapted to be operatively associated when the said ends are connected together, said bolt having a squared tapered portion, and a reduced cylindrical threaded portion and adapted to pass through said tube and the rim of the wheel, a correspondingly tapered sleeve fitted upon the squared portion of the bolt, and having a flange engaging against the inner side of the rim, and a nut adjustably mounted upon the threaded portion of the bolt projecting beyond said rim.

4. A spring tire for wheels comprising a continuous resilient metal tube, a resilient cover wholly inclosing said tube, a split circumferential band arranged within the tube, means for detachably connecting the adjacent ends of the band together, including a leaf spring terminally secured to one end of the band, and a lug carried by the opposite end of the spring for engagement within an opening in the other end of the band, a bolt associated with said band and passed through said tube and rim of the wheel, and a nut adjustably mounted upon said bolt for holding the parts operatively associated.

5. A resilient tire comprising in combination, a continuous resilient metal tube, a casing wholly inclosing said tube, a split band arranged within the tube, a leaf spring secured to one end of said band and bridging the joint between the meeting ends thereof, a lug depending from the spring and adapted to be received within an opening in the other end of said band, a half bolt section integrally connected with each end of the band and depending therefrom, said sections defining a fastening element when associated and adapted to project through the tube and an opening in the rim of the wheel, said element having a squared portion and a threaded portion, a sleeve fitted on said squared portion and arranged within the opening in said rim, and a nut secured to the threaded portion for holding the parts operatively associated.

In testimony whereof I affix my signature in presence of two witnesses.

WILLIAM B. OWEN.

Witnesses:
GEORGE A. PEARCE,
CHAS. H. SPAULDING.

Copies of this patent may be obtained for five cents each, by addressing the "Commissioner of Patents, Washington, D. C."